Feb. 28, 1967 T. GASSINO ET AL 3,306,417

KEYBOARD MECHANISM FOR GENERATING CODE
WITH SELECTABLE CODE MEMBER SETS

Filed April 30, 1965 2 Sheets-Sheet 1

INVENTORS
TERESIO GASSINO
ILARIO BOVIO

BY

AGENT
John Toggenburger

INVENTORS
TERESIO GASSINO
ILARIO BOVIO
BY
AGENT
John Taggenburger

United States Patent Office 3,306,417

Patented Feb. 28, 1967

3,306,417

KEYBOARD MECHANISM FOR GENERATING CODE WITH SELECTABLE CODE MEMBER SETS

Teresio Gassino and Ilario Bovio, Ivrea, Italy, assignors to Ing. C. Olivetti & C., S.p.A., Ivrea, Italy, a corporation of Italy Filed Apr. 30, 1965, Ser. No. 452,094

Claims priority, application Italy, May 4, 1964, 10,308/64

6 Claims. (Cl. 197—17)

This invention relates to a keyboard mechanism for generating code combinations, wherein each key is provided with upper case and lower case characters represented by two different code combinations, said mechanism comprising a setting member associated with each one of said keys and operable at the depression thereof for selectively setting a set of code bars according to said code combinations, and an operable case shift device.

A code combination generating alphanumeric keyboard mechanism is required in teleprinters, accounting machines, typewriters, and similar input equipments for data transmitting or data processing systems. In the known keyboard mechanisms each key is generally provided with two characters represented by two code combinations, for example of a seven-unit code, differing only by a constant unit. In this manner each key is adapted to set six of the seven units of the combination, whereas the seventh unit is automatically set by the case shift device.

These mechanisms have the disadvantage that the two characters of each key are determined by the code and cannot follow the keyboard arrangements used for the various languages.

There are known keyboard mechanisms of the above type, wherein two sets of differently serrated code bars are rendered alternately effective upon operation of the shift device. However said known mechanisms are unadapted for keyboard mechanisms having similar code bars.

This and other disadvantages are obviated by the keyboard mechanism according to the invention, which is characterized in that a pair of selecting members are associated with each one of said keys and are engageable alternately by the associated setting member under the control of said shift device for selectively setting said code bars according to said two code combinations.

This and other characteristics of the invention will become apparent from the following description of a preferred embodiment thereof, and from the accompanying drawings, wherein.

Figure 1:
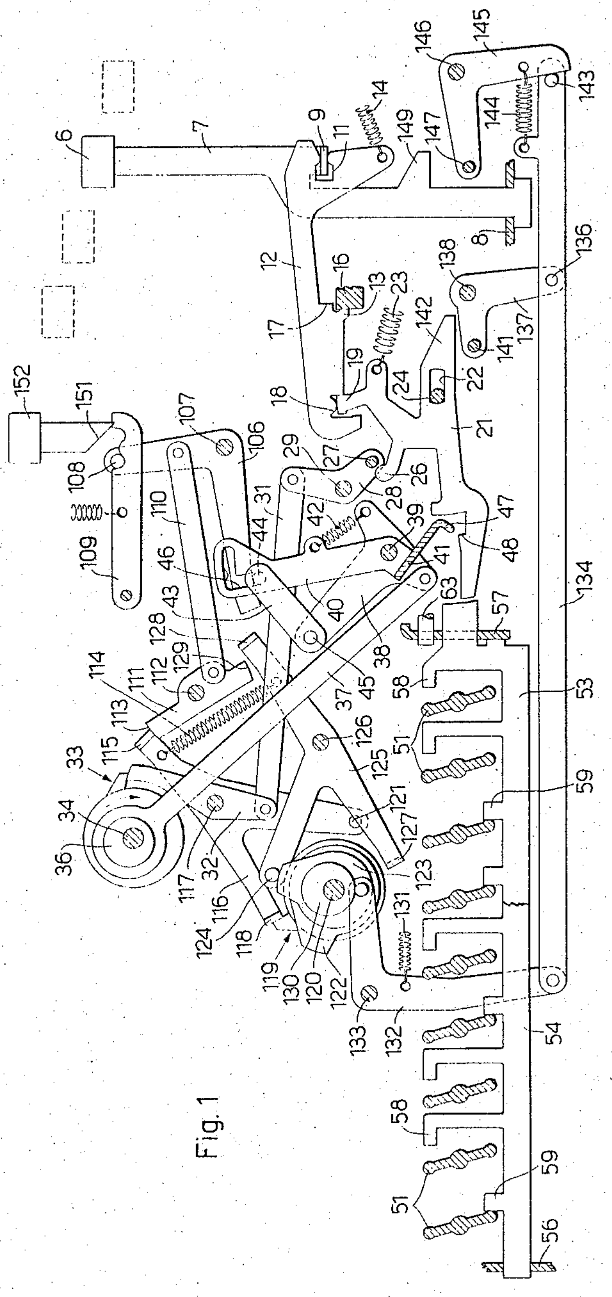
FIG. 1 is a left hand longitudinal partial sectional view of an alphanumeric keyboard mechanism according to the invention.

With reference to FIG. 1, the keyboard mechanism comprises a plurality of alphanumeric keys 6, each one provided with a lower case character and an upper case character, said two characters being represented by two different code combinations of a seven-unit code. Each key 6 is secured to a key stem 7 vertically slidable on a stationary comb plate 8. The stem 7 is provided with a bent lug 9 engaging a notch 11 of a latch 12, which is provided with a projection 13 normally urged by a spring 14 to contact a stationary bar 16. The latch 12 is also provided with a shoulder 17 adapted to cooperate with a bar 16 and it is provided with a vane 18 engaging a projection 19 of a setting member or slide 21 having a slot 22 slidably mounted on a stationary shaft 24. A spring 23 normally urges the slide 21 forward to the position shown in FIG. 1.

Furthermore, the slide 21 is provided with a projection 26 adapted to cooperate with a universal bar 27 secured to a lever 28 fulcrumed at 29 and connected through a link 31 with a lever 32 fulcrumed at 117. The lever 32 controls a normally disengaged one cycle clutch, generically indicated by the numeral 33, which when engaged is adapted to rotate through one revolution a power driven member formed of a main shaft 34. An eccentric 36 secured to the shaft 34 is connected through a connecting rod 37 to a power driven lever 38 fulcrumed on a stationary shaft 39. The lever 38 is yieldable connected to an arm 40 of a universal bail 41 by means of a spring 42 and of a lever 43 fulcrumed on a pivot 45 of the lever 38 and provided with a pin 44 engaging a cam slot 46 of the arm 40. The bail 41 is fulcrumed on the shaft 39 and is provided with a bent edge 47 adapted to engage a shoulder 48 provided on each slide 21 and normally located out of the path of the edge 47.

The keyboard mechanism also comprises a set of nine selectively settable similar code output bars 51 which are tiltable on two pivots 52 (FIG. 3) rotatably mounted on the stationary frame of the mechanism between the counterclockwise position shown in FIG. 1 and a clockwise position symmetric with the position of FIG. 1. Seven of the code bars 51 are adapted to represent the conventional seven-unit code combinations, another code bar 51 is used for effecting the conventional parity check, whereas the last code bar 51 controls a specific locking function, as it will be described later. In any case the nine bars 51 may be considered adapted to generate a nine-unit code.

Each slide 21 is adapted to engage each one of a pair of longitudinally movable selecting members or slides 53 and 54 slidably mounted on a stationary comb plate 56 and on a second comb plate 57 which normally holds the forward end of each slide 53 on the path of the corresponding slide 21 (FIGS. 3 and 4) and the forward end of the slide 54 at left thereof. Each selecting member of the stated pairs 53, 54 has appropriate projections 58, 59 thereon which are correlated to the various code output bars 51 so that each selecting member, when operated, will produce a combinational code setting of said code output bars 51 which is differentiating from the other settings. More particularly, the projection 58 is longer and is adapted to engage the upper edge of the corresponding bar 51 to rock this latter counterclockwise when the slide 53 or 54 is displaced rearwards. On the contrary, the projection 59 is shorter and is adapted to engage the lower edge of the bar 51 to rock it clockwise.

At the depression of an alphanumeric key 6 the lug 9 of the corresponding stem 7 rocks the latch 12 clockwise around the contacting point with the bar 16. The latch 12 releases thus the projection 19 of the slide 21, which is rocked by the spring 23 around the shaft 24. Then the slide 21 on one hand locates its shoulder 48 on the path of the edge 47, on the other hand through its projection 26 engages the universal bar 27, thus rocking the lever 28 counterclockwise. The link 31 rocks now the lever 32 clockwise, whereby the clutch 33 is engaged to rotate the main shaft 34 one revolution clockwise.

Then the eccentric 36 through the connecting rod 37, the lever 38, the lever 43 and the spring 42, rocks the bail 41 clockwise, whereby the edge 47 engages the shoulder 48 of the released slide 21. This latter is now moved rearwards and displaces the corresponding slide 53, the projections 58 and 59 of which selectively set the code bars 51 according to the code combination represented by the slide 53.

Furthermore the slide 21 when moved rearwards engages with the projection 19 the rear end of the latch 12 and brings the shoulder 17 thereof behind the bar 16. Thereafter, when the eccentric 36 causes the bail 41 to be restored, the spring 23 restores the slide 21 forwards. If the key 6 is yet depressed, the shoulder 17 of the latch 12 contacts the bail 16 and rocks the slide 21 so as to disengage the projection 26 from the bar 27 and to return the shoulder 48 out of the path of the edge 47. The repeated operation of the slide 21 is thus prevented until the key 6 will not be released.

The projections 58 and 59 of each slide 53 are arranged according to the code combination of the lower case character of the corresponding key 6, whereas the projections 58 and 59 of each slide 54 are arranged according to the code combination of the corresponding upper case character. The keyboard mechanism is provided with a case shift device comprising means for changing the relationship between the setting member 21 and the code bars 51, by conditioning the slides 54 to be engaged by the setting members 21. Said means comprise the comb plate 57 (FIG. 4) which is slidably mounted with a pair of slots 62 on a pair of stationary pins 63 and is normally urged leftwards by a spring 64. The case shift device comprises also a shift key 66 (FIG. 2) secured to a key stem 67 similar to the stems 7 and normally located in the upper or rest position.

The stem 67 is directly connected to a corresponding latch 68 controlling an upper case setting member or slide 69 similar to the slides 21. The slide 69 is adapted to cooperate with a lug 71 of a lever 72 fulcrumed at 73 and normally urged by a spring 74 to contact a stationary stop 76. An arm 77 of the lever 72 is adapted to cooperate with a lever 78 (FIG. 4) fulcrumed on a stationary pivot 79. The lever 78 is normally urged by a spring 81 to contact a lug 82 of the plate 57. The lever 72 (FIG. 2) is also provided with a second lug 83 normally contacted by a latch 86 which is fulcrumed at 87 and is urged counterclockwise by a spring 84.

The stem 67 is linked with a motion inverting means formed of a two armed lever 88 fulcrumed at 89 and in turn linked with a second stem 91 normally located in depressed position. The stem 91 is connected to a corresponding latch 92 controlling a lower case setting member or slide 93 similar to the slides 69 and 21. The slide 93 normally contacts the bar 16 with its shoulder 17, whereby it is locked in an ineffective position. The slide 93 is adapted to cooperate with a lug 94 of a lever 96 fulcrumed at 73 and provided with a pin 97 adapted to cooperate with a projection 98 of the latch 86.

At the depression of the shift key 66, the stem 67 on one hand releases the upper case setting slide 69, on the other hand rocks the lever 88 clockwise thus displacing the stem 91 upwards The stem 91 causes now the latch 92 to return in the normal position together with the lower case setting slide 93. The slide 69 in turn through the universal bar 27, causes the main shaft 34 (FIG. 1) to effect one cycle, during which the slide 69 (FIG. 2) is displaced rearwards by the edge 47 of the bail 41.

Now the slide 69 engages the lug 71 thus rocking the lever 72 counterclockwise, whereby the arm 77 of the lever 72 rocks the lever 78 (FIG. 4) counterclockwise. The lever 78 through the spring 81, the action of which prevails over the spring 64, displaces the comb plate 57 rightwards in its upper case position. The slides 54 are thus placed in front of the slides 21, while the slides 53 are placed at right thereof. Furthermore, the lever 72 (FIG. 2) by rocking counterclockwise brings its lug 83 above the latch 86 which is suddenly rocked counterclockwise and latches the lever 72 in the rocked positions. Therefore the comb plate 57 (FIG. 4) remains latched in the upper case or rightward position.

At the end of the cycle of the shaft 34 and till the shift key 66 is held depressed the latch 68 will contact with the bar 16 by means of its shoulder 17. When the key 66 is released, the stem 67 on one hand returns upwards, thus restoring the latch 68 and the slide 69 to the position of FIG. 2, on the other hand returns the lever 88 counterclockwise, thus depressing the stem 91. This latter now causes the latch 92 to release the lower case setting slide 93, which through the universal bar 27 causes the main shaft 34 (FIG. 1) to effect one cycle. Then the edge 47 of the bail 41 displaces the slide 93 (FIG. 2) rearwards, whereby the lever 96 is rocked counterclockwise and through the pin 97 and the projection 98 causes the latch 86 to release the lug 83 of the lever 72. The spring 74 restores now the lever 72, while the spring 64 (FIG. 4) returns the comb plate 57 leftwards to the lower case position.

It is thus clear that when the shift device is operated the means 57, 77 and 78 are adapted to change the relationship between the setting members 21 (FIG. 1) and the code bars 51.

Since each code combination differs from each other at least in one code unit, in the case two or more alphanumeric keys 6 are accidentally depressed simultaneously, the slides 53 or 54 displaced rearwards should urge the code bar 51 corresponding to said code unit in opposite directions. This code bar 51 will thus be arrested in the vertical position whereby, through the selecting slides 53 or 54 and the setting slides 21, the bail 41 will be arrested in an intermediate position, while the lever 38 is positively rocked clockwise through its full stroke. The universal bail 41 is thus displaced with respect to the power driven lever 38 and the cam slot 46 forces the pin 44 to rock the lever 43 around the pivot 45.

Now the erroneous code represented by the bars 51 must be prevented from being processed and the keyboard mechanism must be locked. In this order the pin 44 of the lever 43 is normally contacted by a lever 106 pivoted at 107 and provided with a pin 108 cooperating with a spring urged locking lever 109. The lever 106 is adapted to be rocked clockwise to a second position wherein the pin 108 is placed on the path of a tapered edge 151 of a releasing key 152 depressible for releasing the locked keyboard mechanism.

The lever 106 is connected through a link 110 with a lever 111 pivoted at 112. An end 113 of the lever 111 is normally contacted by a first lug 115 of a lever 116 fulcrumed at 117. A second lug 118 of the lever 116 controls a clutch, generically indicated by the numeral 119, which is adapted to rotate in a known manner a shaft 120 through one cycle of 180 degrees. The lever 116 is also provided with a pin 121 adapted to cooperate with a cam 122 of the shaft 120. Another cam 123 of the shaft 120 cooperates with a lever 125 fulcrumed at 126 and connected by a spring 114 to the lever 116. The lever 125 is provided with a first lug 127 normally positioned for disengaging the clutch 119 after rotating the shaft 120 one cycle of 180 degrees. The lever 125 is also provided with a second lug 128 adapted to cooperate with another end 129 of the lever 111.

Secured to the shaft 120 is also an eccentric 130 normally contacted by a lever 132 fulcrumed at 133 and urged counterclockwise by a spring 131. The lever 132 is connected through a link 134 with a lever 137 fulcrumed at 138 and secured to a universal bar 141 adapted to cooperate with a projection 142 of the setting slides 21. Furthermore, the link 134 is provided with a pin 143 normally contacted by a lever 143 pivoted at 146 and urged clockwise by a spring 144. Secured to the lever 145 is a universal bar 147 adapted to cooperate with a projection 149 of each key stem 7.

When the lever 43 is rocked counterclockwise by the cam slot 46, the pin 44 rocks the lever 106 clockwise thus placing the pin 108 on the path of the edge 151. Furthermore, the lever 106 through the link 110 rocks counterclockwise the lever 111 which on one hand brings its end 129 on the path of the lug 128, on the other hand it releases the lug 115 from its end 113. The spring 114 rocks now the lever 116 clockwise, whereby the lug 118 causes the clutch 119 to be engaged and the shaft 120 is rocked clockwise through one cycle of 180 degrees.

At the beginning of the cycle of the shaft 120 the cam 123 causes the lever 125 to be rocked counterclockwise, but the lug 128 is immediately arrested by the end 129 of the lever 111 and the lug 127 remains predisposed for disengaging the clutch 119. In turn the eccentric 130 rocks the lever 132 clockwise thus displacing the link 134 rearwards. The link 134 on one hand rocks the lever 137 clockwise thus displacing the universal bar 141 upwards, on the other hand it causes the spring 144 to rock the lever 145 counterclockwise thus displacing the universal bar 147 upwards. Near the end of the cycle the cam 122 of the shaft 120 engages the pin 121 and rocks the lever 116 counterclockwise.

Now if a key 6 is depressed, the bar 141 prevents the setting slide 21 from being rocked clockwise, whereby the projection 26 does not engage the universal bar 27. Furthermore, the projection 149 of the stem 7 encounters the bar 147. The depressed key 6 must thus overcome the additional tension of the spring 144, whereby the operator is notified that the keyboard mechanism has been locked.

The locked keyboard mechanism may be released by depressing the release key 152. Then this latter engages with the tapered edge 151 the pin 108 and returns thus the lever 106 counterclockwise to the position of FIG. 1. The link 110 restores now the lever 111, the end 113 of which returns on the path of the lug 115, while the end 129 releases the lug 128 of the lever 125. The spring 114 rocks thus the lever 125 counterclockwise, whereby the lug 127 causes the clutch 119 to be engaged and to rotate the shaft 120 for another cycle of 180 degrees. During this cycle the eccentric 130 through the lever 132 and the link 134 restores the two bars 141 and 147. At the end of the cycle the clutch 119 is disengaged by the lug 118 of the lever 116, whereby the keyboard mechanism is again ready for generating code combinations.

Figure 2:
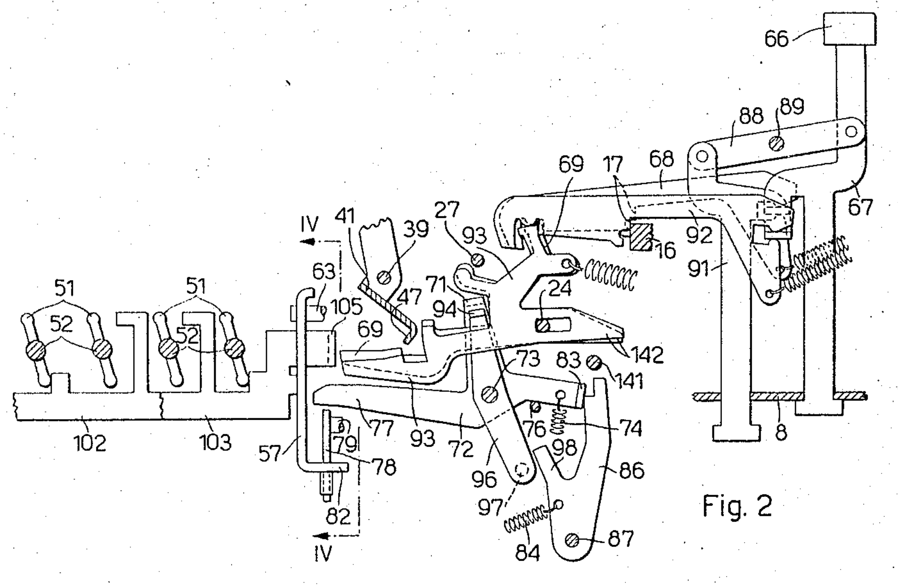
FIG. 2 is another left hand sectional view of the keyboard mechanism.
Figure 3:
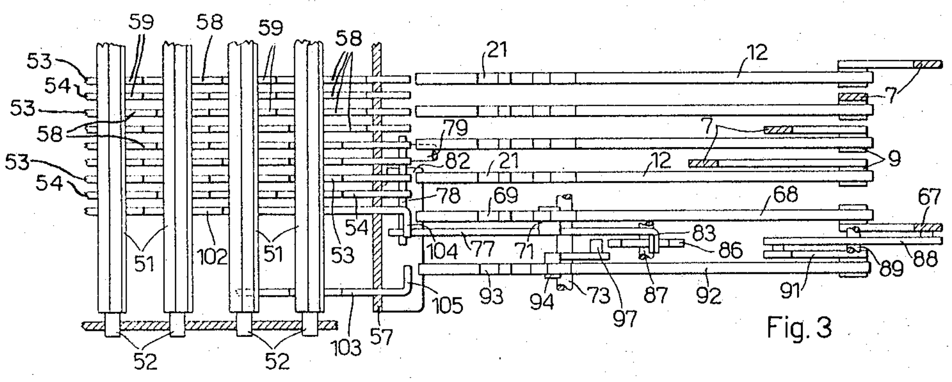
FIG. 3 is a partial plan view of the keyboard mechanism.
Figure 4:
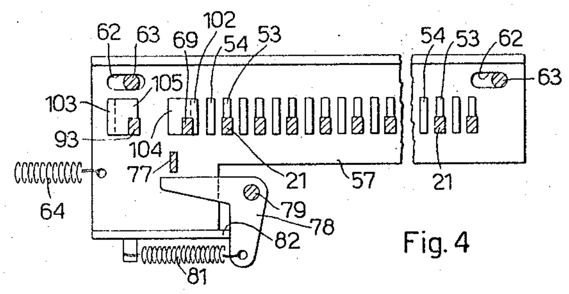
FIG. 4 is a partial sectional view according to the line IV—IV of FIG. 2.

A code combination may result erroneously if an alphanumeric setting slide 21 is operated simultaneously with the upper or lower case setting slide 69, 93 (FIG. 2). In order to prevent such a simultaneous operation each one of the two slides 69 or 93 is adapted to engage a corresponding selecting slide 102, respectively 103, which will engage a corresponding combination of the bars 51, one of which is provided for being operated by the slides 102, 103 differently than the slides 53, 54 (FIG. 3). The lever 43 is thus rocked counterclockwise and the keyboard mechanism is locked each time the slide 69 or 93 is operated simultaneously with a slide 21. Since during the operation of the slides 102 and 103 the comb plate 57 is transversely displaced, the slides 102 and 103 are provided with a lug 104, and 105 respectively, which are engageable by the corresponding setting slides 69 and 93 in both transverse positions of the comb plate 57.

It is intended that modifications, improvements and additions of parts may be made to the described keyboard mechanism without departing from the scope of the invention. For example one or more slides 53, 54, 102, 103 may directly engage a corresponding control member in order to effect a function simultaneously with the generation of the code combination.

Furthermore, the code bars 51 may generate the code combinations by means of electric contacts, the signals of which are picked up at a predetermined time in order to be sure that the bars 51 reached the required position.

What we claim is:

1. In a keyboard mechanism for generating code combinations, each key of said keyboard having an upper case character and a lower case character, said characters being represented by two different code combinations, in combination with a power operating mechanism:

(a) a set of tiltable similar code bars selectively settable in two tilted positions for generating said code combinations, (b) a setting member associated with each one of said keys and operable by said operating mechanism at the depression of the associated key, (c) a pair of selecting members associated with each one of said keys and engageable by said setting member for selectively setting said code bars according to said two code combinations, (d) a support for said selecting members, (e) means shiftably mounting said support transversely to the operating movement of said setting members for conditioning said pair of members to be alternately engaged, (f) a case shift device comprising a depressible case shift key, (g) an upper case setting member operable by said operating mechanism at the depression of said shift key for shifting said support in a transverse direction, (h) a lower case setting member operable by said operating mechanism at the restoration of said shift key for shifting said support in an opposite direction, (i) a first element directly connected to said shift key for causing said upper case setting member to be so operated, (j) a second element for causing said lower case setting member to be operated, (k) and motion inverting means constantly connecting said second element to said shift key.

2. In a keyboard mechanism for generating code combinations, each key of said keyboard having an upper case character and a lower case character, said characters being represented by two different code combinations, (a) a set of tiltable similar code bars selectively settable in two tilted positions for generating said code combinations, (b) a setting member associated with each one of said keys and conditionable for operation at the depression of the associated key, (c) a pair of selecting members associated with each one of said keys and engageable by said setting member when operated for selectively setting said code bars according to said two code combinations, (d) each one of said selecting members being provided in correspondence with each one of said code bars with one of a pair of opposite projections adapted to positively set the corresponding code bar when said selecting member is so engaged, (e) a universal member for operating said setting member when so conditioned, (f) an operable case shift device, (g) means comprised in said device and operable by said universal member for conditioning said pair of selecting members to be alternately engaged, (h) and a power driven member yieldably connected to said universal member, said universal member being displaced with respect to said driven member when more than one selecting member is engaged due to the locking action of at least one of said code bars on said opposite projections.

3. In a keyboard mechanism for generating code combinations, each key of said keyboard having an upper case character and a lower case character, said characters being represented by two different code combinations, (a) a set of tiltable similar code bars selectively settable in two tilted positions for generating said code combinations, (b) a setting member associated with each one of said keys and conditionable for operation at the depression of the associated key, (c) a pair of selecting members associated with each one of said keys and engageable by said setting member when operated for selectively setting said code bars according to said two code combinations, (d) said selecting member being provided in correspondence with each one of said code bars with one of a pair of opposite projections adapted to positively set the corresponding code bar when said selecting member is so engaged, (e) a universal member for operating said setting member when so conditioned, (f) an operable case shift device, (g) means comprised in said device and operable by said universal member for conditioning said pair of selecting members to be alternately engaged, (h) a power driven member yieldably connected to said universal member, (i) a cam element, (j) a cam following element, (k) means mounting said elements on said universal member and on said driven member, said cam following element being displaced by said cam element when more than one selecting member is engaged due to the locking action of at least one of said code bars on said opposite projections, (l) and locking means conditioned by said cam following elements when so displaced for locking said keyboard mechanism.

4. In a keyboard mechanism for generating code combinations, each key of said keyboard having an upper case character and a lower case character, said characters being represented by two different code combinations, (a) a set of tiltable similar code bars selectively settable in two tilted positions for generating said representations, (b) a setting member associated with each one of said keys and conditionable for operation at the depression of the associated key, (c) a pair of selecting members associated with each one of said keys and engageable by said setting member when operated for selectively setting said code bars according to said two code combinations, (d) said selecting member being provided in correspondence with each one of said code bars with one of a pair of opposite projections adapted to positively set the corresponding code bar when said selecting member is so engaged, (e) a universal member for operating said setting member when so conditioned, (f) an operable case shift device, (g) means comprised in said device and operable by said universal member for conditioning said pair of selecting members to be alternately engaged, (h) a power driven member yieldably connected to said universal member, (i) a cam element, (j) a cam following element, (k) means mounting said elements on said universal member and on said driven member, said cam following element being displaced by said cam element when more than one selected member is engaged due to the locking action of at least one of said code bars on said opposite projection, (l) locking means power operated upon displacement of said cam following element for locking said keyboard mechanism, (m) a key for releasing the keyboard mechanism so locked, (n) and releasing means power operated upon depressing said releasing key for disabling said locking means.

5. In a mechanism according to claim 4, (a) a clutch adapted to be alternately engaged by said cam following element and by said releasing key for alternately operating said locking means and said releasing means.

6. In a keyboard mechanism for generating code combinations, each key of said keyboard having an upper case character and a lower case character, said characters being represented by two different code combinations, (a) a set of tiltable similar code bars selectively settable in two tilted positions for generating said code combinations, (b) a setting member associated with each one of said keys and conditionable for operation at the depression of the associated key, (c) a pair of selecting members engageable by said setting member when operated for selectively setting said code bars according to said two code combinations, (d) a support for said selecting members, (e) means shiftably mounting said support transversely to the operating movement of said setting members for conditioning said pair of members to be alternately engaged, (f) a case shift device comprising a depressible case shift key, (g) an upper case setting member conditioned for operation at the depression of said shift key for shifting said support in a transverse direction, (h) a lower case setting member conditioned for operation at the restoration of said shift key for shifting said support in an opposite direction, (i) two further selecting members mounted on said support and associated with each one of said upper case setting member and said lower case setting member for setting said code bars according to the case shift code combinations, each one of said further selecting members being adapted to be engaged by the associated case setting member in both shifting positions of said support, (j) a universal member for operating each one of said setting members when so conditioned, (k) and a power driven member yieldably connected to said universal member, (l) a cam element, (m) a cam following element, (n) means mounting said elements on said universal member and on said driven member, said cam following element being displaced by said cam element when more than one setting member is so conditioned, (o) and locking means power operated upon displacement of said cam following element for locking said keyboard mechanism.

References Cited by the Examiner

UNITED STATES PATENTS

| | | | |
|---|---|---|---|
| 764,070 | 7/1904 | Parker | 197—110 |
| 1,974,307 | 9/1934 | Griffith | 178—17 |
| 1,988,943 | 1/1935 | Griffith | 178—17 |
| 2,559,637 | 7/1951 | Kirchel | 178—17 |
| 2,891,649 | 6/1959 | Peterson | 197—14 |
| 2,938,952 | 5/1960 | Roggenstein | 178—17 |
| 3,151,722 | 10/1964 | Salto | 197—17 |
| 3,189,153 | 6/1965 | Barnard et al. | 197—17 |

ROBERT E. PULFREY, *Primary Examiner*.

E. S. BURR, *Assistant Examiner*.